(12) United States Patent
Nakarmi et al.

(10) Patent No.: US 11,870,765 B2
(45) Date of Patent: *Jan. 9, 2024

(54) OPERATION RELATED TO USER EQUIPMENT USING SECRET IDENTIFIER

(71) Applicant: Telefonaktiebolaget LM Ericsson (publ), Stockholm (SE)

(72) Inventors: Prajwol Kumar Nakarmi, Sollentuna (SE); Noamen Ben Henda, Stockholm (SE); Christine Jost, Lund (SE); Vesa Torvinen, Sauvo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,967

(22) Filed: Dec. 22, 2022

(65) Prior Publication Data
US 2023/0208823 A1 Jun. 29, 2023

Related U.S. Application Data

(63) Continuation of application No. 16/951,614, filed on Nov. 18, 2020, now Pat. No. 11,539,683, which is a
(Continued)

(51) Int. Cl.
*H04M 1/66* (2006.01)
*H04M 1/68* (2006.01)
(Continued)

(52) U.S. Cl.
CPC .............. *H04L 63/08* (2013.01); *H04L 63/30* (2013.01); *H04M 3/2281* (2013.01); *H04W 8/08* (2013.01);
(Continued)

(58) Field of Classification Search
CPC ......... H04W 12/0602; H04W 12/0609; H04W 12/0017; H04W 12/00514; H04W 8/08; H04W 84/042; H04L 63/30; H04L 63/08
(Continued)

(56) References Cited

U.S. PATENT DOCUMENTS 7,295,848 B1 11/2007 Eloranta
8,712,056 B2 4/2014 Hall
(Continued)

FOREIGN PATENT DOCUMENTS

CN 101808313 8/2010
CN 101969638 2/2011
(Continued)

OTHER PUBLICATIONS

International Search Report and Written Opinion dated Oct. 6, 2017 issued in International Application No. PCT/EP2017/067527. (10 pages).
(Continued)

*Primary Examiner* — Marceau Milord
(74) *Attorney, Agent, or Firm* — Rothwell, Figg, Ernst & Manbeck, P.C.

(57) ABSTRACT

A method performed by a network node of a serving public land mobile network, PLMN, associated with a user equipment, UE, comprising: obtaining a secret identifier that uniquely identifies the UE, wherein the secret identifier is a secret that is shared between the UE and at least a home PLMN of the UE and that is shared by the home PLMN with the network node; and performing an operation related to the UE using the secret identifier. Other methods, computer programs, computer program products, network nodes and a serving PLMN are also disclosed.

11 Claims, 9 Drawing Sheets

Related U.S. Application Data continuation of application No. 16/782,702, filed on Feb. 5, 2020, now Pat. No. 10,887,300, which is a continuation of application No. 16/318,622, filed as application No. PCT/EP2017/067527 on Jul. 12, 2017, now Pat. No. 10,609,561.

(60) Provisional application No. 62/363,814, filed on Jul. 18, 2016.

(51) Int. Cl.
| | | |
|---|---|---|
| *H04M 3/16* | (2006.01) | |
| *H04L 9/40* | (2022.01) | |
| *H04W 8/08* | (2009.01) | |
| *H04W 84/04* | (2009.01) | |
| *H04W 12/02* | (2009.01) | |
| *H04M 3/22* | (2006.01) | |
| *H04W 12/06* | (2021.01) | |
| *H04W 12/03* | (2021.01) | |
| *H04W 12/037* | (2021.01) | |
| *H04W 12/062* | (2021.01) | |
| *H04W 12/069* | (2021.01) | |
| *H04W 12/72* | (2021.01) | |

(52) U.S. Cl.
CPC .......... *H04W 12/02* (2013.01); *H04W 12/03* (2021.01); *H04W 12/037* (2021.01); *H04W 12/06* (2013.01); *H04W 12/062* (2021.01); *H04W 12/069* (2021.01); *H04W 12/72* (2021.01); *H04W 84/042* (2013.01)

(58) Field of Classification Search
USPC ................ 455/411, 433, 435.1, 432.3, 435.2
See application file for complete search history.

(56) References Cited

U.S. PATENT DOCUMENTS

| | | | |
|---|---|---|---|
| 8,737,371 B2 | 5/2014 | Velev et al. | |
| 9,031,539 B2 | 5/2015 | Mohajeri | |
| 9,112,905 B2 | 8/2015 | Mao | |
| 9,445,443 B2 | 9/2016 | Horn et al. | |
| 9,450,919 B2 | 9/2016 | Mohajeri et al. | |
| 9,451,098 B2 | 9/2016 | Zhu et al. | |
| 9,451,421 B1* | 9/2016 | Allen ...................... H04L 41/08 | |
| 9,756,014 B2 | 9/2017 | Collins et al. | |
| 9,883,384 B2 | 1/2018 | Lee | |
| 9,913,236 B2 | 3/2018 | Allen et al. | |
| 9,942,762 B2 | 4/2018 | Griot et al. | |
| 9,980,133 B2 | 5/2018 | Barrett et al. | |
| 9,992,676 B2* | 6/2018 | Shi ........................ H04W 12/64 | |
| 9,998,449 B2 | 6/2018 | Lee et al. | |
| 9,998,917 B2 | 6/2018 | Lee | |
| 10,021,559 B2 | 7/2018 | Faccin et al. | |
| 10,103,943 B2 | 10/2018 | Wu | |
| 10,117,090 B2 | 10/2018 | Jahangir | |
| 10,334,432 B2 | 6/2019 | Lee | |
| 10,582,382 B2 | 3/2020 | Chen | |
| 10,609,561 B2* | 3/2020 | Nakarmi .............. H04W 84/042 |
| 10,887,300 B2* | 1/2021 | Nakarmi ................. H04W 8/08 |
| 10,931,644 B2 | 2/2021 | Norrman | |
| 11,539,683 B2* | 12/2022 | Nakarmi ................. H04L 63/08 |
| 2011/0075675 A1 | 3/2011 | Koodli et al. | |
| 2012/0044949 A1 | 2/2012 | Velev et al. | |
| 2012/0252445 A1 | 10/2012 | Lindholm et al. | |
| 2013/0128873 A1 | 5/2013 | Eipe et al. | |
| 2013/0196630 A1 | 8/2013 | Ungvari et al. | |
| 2013/0324082 A1 | 12/2013 | Mohajeri | |
| 2014/0059343 A1 | 2/2014 | Mohajeri et al. | |
| 2015/0021635 A1 | 1/2015 | Qian et al. | |
| 2015/0097669 A1* | 4/2015 | Li .......................... G08B 21/24 |
| | | | 455/435.1 |
| 2015/0143125 A1* | 5/2015 | Nix ....................... H04L 9/3249 |
| | | | 713/171 |
| 2015/0281966 A1* | 10/2015 | Griot ..................... H04W 12/06 |
| | | | 726/5 |
| 2015/0326612 A1* | 11/2015 | Faccin .................. H04W 48/16 |
| | | | 726/1 |
| 2016/0021635 A1 | 1/2016 | Lee et al. | |
| 2016/0021691 A1 | 1/2016 | Lee | |
| 2016/0094542 A1* | 3/2016 | Lee ...................... H04W 12/069 |
| | | | 726/7 |
| 2016/0316363 A1* | 10/2016 | Li .......................... H04W 12/04 |
| 2017/0006571 A1 | 1/2017 | Allen et al. | |
| 2017/0041776 A1* | 2/2017 | Faccin ................. H04L 65/1066 |
| 2017/0048702 A1 | 2/2017 | Barrett et al. | |
| 2017/0134444 A1* | 5/2017 | Buckley ................ H04L 9/3271 |
| 2018/0019871 A1 | 1/2018 | Gage | |
| 2018/0020351 A1 | 1/2018 | Lee | |
| 2018/0115893 A1 | 4/2018 | Lee et al. | |
| 2018/0332555 A1 | 11/2018 | Kunz | |

FOREIGN PATENT DOCUMENTS

| | | |
|---|---|---|
| CN | 103152731 | 6/2013 |
| EP | 2 244 495 | 10/2010 |
| JP | 2003-522504 | 7/2003 |
| JP | 2012-524437 | 10/2012 |
| JP | 2013-176042 | 9/2013 |
| WO | 2016/010760 | 1/2016 |

OTHER PUBLICATIONS

3GPP TR 33.899 V0.2.0 (May 2016); 3rd Generation Partnership Project; Technical Specification Group Services and System Aspects; Study on the security aspects of the next generation system (Release 14). (75 pages).

Ericsson et al., "New privacy solution on enhancing the concealment of permanent or long-term subscriber identifier", 3GPP TSG-SA WG3 Meeting #84; Chennai, India, Jul. 2016; S3-160995 (3 pages).

Notice of Reasons for Rejection dated Jan. 28, 2020 issued in Japanese Patent Application No. 2019-501996. (5 pages).

Preliminary Rejection dated Jun. 5, 2020 issued in Korean Patent Application No. 10-2019-7004674 (with summary). (11 pages).

* cited by examiner

OPERATION RELATED TO USER EQUIPMENT USING SECRET IDENTIFIER

CROSS-REFERENCE TO RELATED APPLICATIONS

This application is a continuation of U.S. application Ser. No. 16/951,614, filed on Nov. 18, 2020, (now U.S. Pat. No. 11,539,683, issued on Dec. 27, 2022), which is a continuation of U.S. application Ser. No. 16/782,702, filed on Feb. 5, 2020 (now U.S. Patent 10,887,300, issued on Jan. 5, 2021), which is a continuation of U.S. application Ser. No. 16/318,622, having a section 371(c) date of Jan. 17, 2019 (now U.S. Pat. 10,609,561, issued on Mar. 31, 2020), which is a 35 U.S.C. § 371 National Stage of International Patent Application No. PCT/EP2017/067527, filed Jul. 12, 2017, which claims priority to U.S. provisional application no. 62/363,814, filed on Jul. 18, 2016. The above identified applications and patent are incorporated by reference.

TECHNICAL FIELD

The invention relates to methods wherein an identifier related to a user equipment (UE) is made available for a serving public land mobile network (PLMN). The invention also relates to network nodes, a public mobile land network, computer programs and computer program products.

BACKGROUND

In existing wireless network systems (e.g., 2G, 3G, 4G systems), certain operations require that serving PLMNs (other than the home PLMN of the UE) to have access to a particular identifier of the UE, such as an International Mobile Subscriber Identity (IMSI). Knowledge of a long-term identifier corresponding to the UE, however, allows third parties to compromise the privacy of the user, for example, by determining the location of the user based on the identifier. As a result, this UE identifier is typically kept private and treated as a secret, and as such, is often only available to the UE, the home PLMN of the UE, and any other party or device to which access to the identity has been granted by the home PLMN or UE. Though some existing networks utilize encryption methods and/or pseudonyms for UE identities to communicate an identifier of the UE between PLMNs and devices, the communicated identifier is not the secret, long-term identifier of the UE required by some serving PLMN operations.

Therefore, improved techniques for trusted communication of secret UE identifiers are needed to ensure that required UE functionality is maintained across PLMNs without exposing sensitive user information to untrusted parties.

General security-related discussions are ongoing within the $3^{rd}$ Generation Partnership Project for the Next Generation system. 3GPP TR 33.899 V0.2.0 discusses threats, potential requirements and solutions related to such a system. The document states that lawful interception and other local regulations must be taken into account when designing the new system, but also that the exposure of a subscriber's identity might lead to privacy incidents. No solution is provided to the complex problem of enabling a serving PLMN to perform e.g. lawful interception without risking interception of the wrong subscriber, erroneous charging, and unauthorized access to network resources.

SUMMARY

An object of one or more embodiments of the invention is to enable improved trusted communication of a secret UE identifier across PLMNs without exposing sensitive user information to untrusted parties.

One or more embodiments herein allow for communication of a secret identifier of a UE from a home PLMN of the UE to a serving PLMN. Once obtained by the serving PLMN, the secret identifier can be utilized by the serving PLMN for performing an operation related to the UE. Hereby it is also achieved that network system complexity and security threats can be reduced with respect to operations in a serving PLMN based on a pseudonym identifier.

A first aspect of the invention relates to a method performed by a network node of a serving PLMN associated with a UE. In the method, the network node obtains a secret identifier that uniquely identifies the UE. The secret identifier is a secret that is shared between the UE and at least a home PLMN of the UE and that is shared by the home PLMN with the network node. The method also includes the network node performing an operation related to the UE using the secret identifier.

A second aspect of the invention relates to a method performed by a network node of a home PLMN associated with a UE. The network node determines to reveal a secret identifier that uniquely identifies the UE to a serving PLMN of the UE. The secret identifier is a secret that is shared between the UE and at least the home PLMN. According to the method, the network node of the home PLMN reveals the secret identifier to the serving PLMN. Revealing the secret identifier to the serving PLMN allows the serving PLMN to perform an operation related to the UE using the secret identifier.

A third aspect relates to a network node of a serving PLMN associated with a UE. The network node is configured to obtain a secret identifier that uniquely identifies the UE, wherein the secret identifier is a secret that is shared between the UE and at least a home PLMN of the UE and that is shared by the home PLMN with the network node; and perform an operation related to the UE using the secret identifier.

A fourth aspect relates to a network node of a home PLMN associated with a UE. This network node is configured to determine to reveal, to a serving PLMN of the UE, a secret identifier that uniquely identifies the UE, wherein the secret identifier is a secret that is shared between the UE and at least the home PLMN; and reveal the secret identifier to the serving PLMN, the secret identifier allowing the serving PLMN to perform an operation related to the UE using the secret identifier.

A fifth aspect relates to a network node of a serving PLMN associated with a UE, the network node comprising a processor and a memory, the memory containing instructions executable by the processor whereby the network node is configured to: obtain a secret identifier that uniquely identifies the UE, wherein the secret identifier is a secret that is shared between the UE and at least a home PLMN of the UE and that is shared by the home PLMN with the network node; and perform an operation related to the UE using the secret identifier.

A sixth aspect relates to a network node of a home PLMN associated with a UE, the network node comprising a processor and a memory, the memory containing instructions executable by the processor whereby the network node is configured to: determine to reveal, to a serving PLMN of the UE, a secret identifier that uniquely identifies the UE, wherein the secret identifier is a secret that is shared between the UE and at least the home PLMN; and reveal the secret identifier to the serving PLMN, the secret identifier allowing the serving PLMN to perform an operation related to the UE using the secret identifier.

A seventh aspect relates to a network node of a serving PLMN associated with a UE. The network node comprises: a first module configured to obtain a secret identifier that uniquely identifies the UE, wherein the secret identifier is a secret that is shared between the UE and at least a home PLMN of the UE and that is shared by the home PLMN with the network node; and a second module to perform an operation related to the UE using the secret identifier.

An eighth aspect relates to a network node of a home PLMN associated with a UE. The network node comprises: a first module configured to determine to reveal, to a serving PLMN of the UE, a secret identifier that uniquely identifies the UE, wherein the secret identifier is a secret that is shared between the UE and at least the home PLMN; and a second module configured to reveal the secret identifier to the serving PLMN, the secret identifier allowing the serving PLMN to perform an operation related to the UE using the secret identifier.

A ninth aspect relates to a computer program comprising instructions which, when executed by at least one processor of a network node, causes the network node to carry out any one of the above methods.

A tenth aspect relates to a carrier containing the computer program, wherein the carrier is one of an electric signal, optical signal, radio signal, or computer readable storage medium.

An eleventh aspect relates to a method performed by a serving PLMN associated with a UE. The method comprises the steps of receiving, from a home PLMN of the UE after the UE has been successfully authenticated by the home PLMN or the serving PLMN, a secret identifier that uniquely identifies the UE, wherein the secret identifier is a secret previously shared between the UE and a home PLMN of the UE; and performing an operation related to the UE.

A twelfth aspect relates to a method performed by a home PLMN associated with a UE. The method comprises the steps of determining to reveal, to a serving PLMN of the UE, a secret identifier that uniquely identifies the UE, wherein the secret identifier is a secret that is shared between the UE and the home PLMN; revealing the secret identifier to the serving PLMN after the UE has been successfully authenticated by the home PLMN or the serving PLMN, the secret identifier allowing the serving PLMN to perform an operation related to the UE.

A thirteenth aspect relates to a serving PLMN associated with a UE. The serving PLMN here comprises at least two network nodes, wherein a first network node is configured to receive, from a home PLMN of the UE after the UE has been successfully authenticated by the home PLMN or the serving PLMN, a secret identifier that uniquely identifies the UE, wherein the secret identifier is a secret that was shared between the UE and the home PLMN. A second network node is in this serving PLMN configured to perform an operation related to the UE using the secret identifier.

The secret identifier may in one or more embodiments of the aspects mentioned above be an unencrypted long-term identifier, e.g. IMSI.

The UE may in one or more embodiments of the aspects mentioned above be authenticated by the serving PLMN. In such embodiments, the secret identifier may be sent from the home PLMN in an update-location-answer message from the home PLMN.

The operation may in one or more embodiments of the aspects mentioned above be lawful interception or charging control related to the UE.

DETAILED DESCRIPTION

Figure 1:
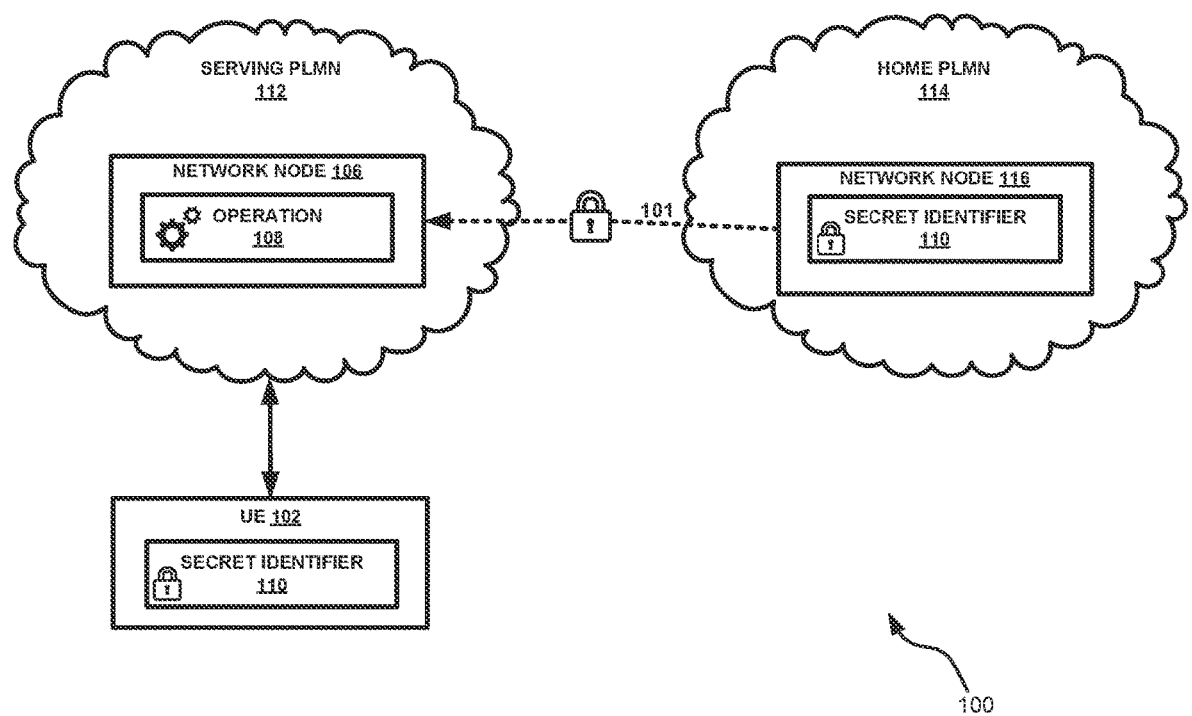
FIG. 1 illustrates a communication network corresponding to example embodiments of the invention.

FIG. 1 illustrates a communication system 100 that includes a home PLMN 114 for a UE 102 and a serving PLMN 112 that provides network access and services to the UE 102. As shown in FIG. 1, the serving PLMN 112 includes a network node 106 (among a plurality of network devices that are not explicitly shown), which is configured to perform at least an operation 108 related to the UE 102 (other UE-related operations performed may exist but are not shown). In some examples, a secret identifier 110 of the UE 102 must be available to the network node 106 (or to the serving PLMN 112, generally) in order for the operation 108 to be performed. By default, however, this secret identifier 110 may be kept as a secret between the home PLMN 114 and the UE 102 (and potentially other devices and/or networks to which the secret identifier 110 has been revealed previously). As such, in at least some examples, the serving PLMN 112 may be required to obtain the secret identifier 110 as a prerequisite to performing the operation 108. The UE may be for example a mobile phone, a laptop a tablet and an embedded device in e.g. white goods (such as refrigerator) or a vehicle (such as an infotainment system in the dashboard of a car or truck). The network node 106 may for example be an Access and Mobility Management Function (AMF), Security Anchor Function (SEAF), Security Context Management Function (SCMF), Session Management Function (SMF) and Policy Control Function (PCF).

In a feature of the invention, the network node 106 of the serving PLMN 112 obtains the secret identifier 110 of the UE 102, for example, via one or more messages 101 sent by a network node 116 (or any other permitted device) of the home PLMN 114. By revealing this secret identifier 110 to the serving PLMN 112, the home PLMN 114 allows the network node 106 of the serving PLMN 112 to perform the operation 108. Other features of the operation, structure, and features of the communication system 100 and the devices and networks therein shown in FIG. 1 will be introduced and explained below with reference to the remaining figures. The network node 116 may for example be an Authentication Server Function (AUSF), Authentication Credential Repository and Processing Function (ARPF), Unified Data Management (UDM), AAA-server (Authentication, Authorization and Accounting server), Structured Data Storage Function (SDSF), and Unstructured Data Storage Function (UDSF).

Before proceeding with further detailed description of the example embodiments, it should be noted that any disclosure that refers to a particular PLMN can be understood as also referring to the network node associated with the particular PLMN. Likewise, any disclosure that refers to a particular network node can be understood as also referring to the PLMN associated with the particular network node. For instance, any feature that is disclosed as corresponding to or being performed by home PLMN 114 should likewise be understood as optionally corresponding to or being performed by network node 116 of FIG. 1. Similarly, any feature that is disclosed as corresponding to or being performed by serving PLMN 112 should likewise be understood as optionally corresponding to or being performed by network node 106 of FIG. 1. With that said, any two or more features or functionalities described as being performed by a PLMN should not be read as necessarily being associated with or performed by the exact same device in the PLMN. Instead, any two or more features that are disclosed as being performed by or associated with a particular PLMN, or disclosed as being performed by or associated with a network node of a particular PLMN should be read as optionally being associated with or performed by different example network nodes of the PLMN. An example of this would be an apparatus comprising two network nodes of the serving PLMN, where a first network node receives the secret identifier 110 from the home PLMN and then enables, through the knowledge of the secret identifier 110, a second network node to perform an operation related to the UE 102.

In an example of this directive, if the present disclosure states that "the serving PLMN 112 stores the public identifier in its memory," it should also be understood to likewise disclose that "the network node 106 stores the public identifier in the memory of the network node 106 or in any other network node or device of the serving PLMN 112 that contains memory upon which the public identifier may be stored." Furthermore, if the disclosure additionally states that "the serving PLMN 112 compares a public identifier to an encrypted secret identifier," it should be understood to likewise disclose that "a comparison of the public identifier and an encrypted secret identifier may be performed at the same network node 106 that stored the public identifier above, or at any other network node (other than the particular network node at which the public identifier was stored in memory) of the serving PLMN that can be understood as performing such a comparison." In other words, the home and serving PLMNs should be understood as optionally comprising a plurality of network nodes, one or more of which can perform the disclosed functions or features attributed to the PLMN or to a network node thereof.

Figure 2:
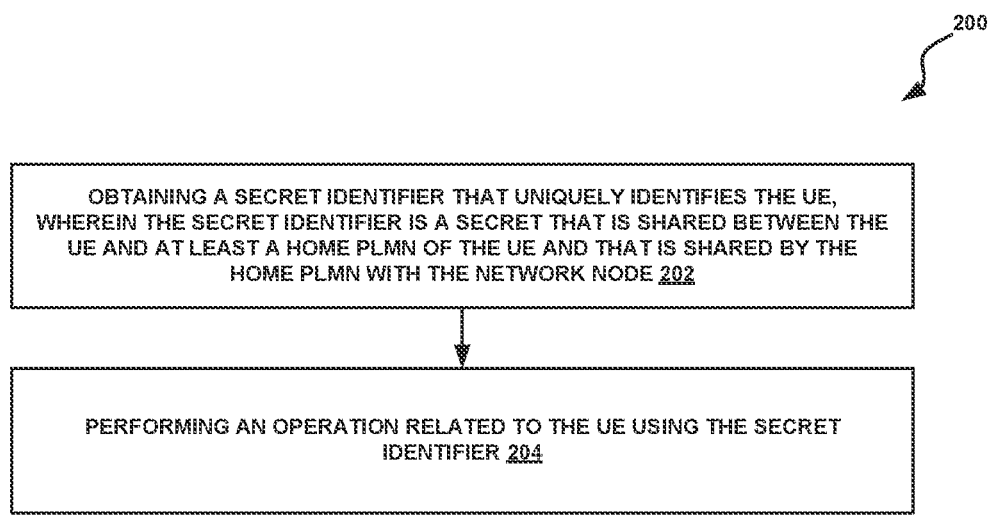
FIG. 2 illustrates a method performed by a network node of a serving PLMN according to one or more embodiments.

FIG. 2 illustrates an example method 200 performed by the network node 106 of the serving PLMN 112 for performing the operation 108 that requires knowledge of (or access to) the secret identifier 110 of the UE 102 served by the serving PLMN 112. In some examples, the required secret identifier 110 may identify the UE itself, although it may additionally or alternatively be associated with a particular user or subscriber account corresponding to the UE, where the subscriber account may have particular authentication credentials, charging account or records, tokening and access policies, service parameters including QoS or subscriber level for one or more services, or the like, each of which may be established and/or maintained at the home PLMN 114 of the UE 102. Accordingly, for purposes of the present disclosure, the term user equipment refers to not only a particular device, but may also refer to a subscriber or user having an associated home PLMN. In other words, a secret identifier 110 in the form of an International Mobile Subscriber Identity (IMSI) that uniquely identifies the UE 102 can analogously be said to uniquely identify a subscriber/user to the home PLMN 114 rather than the UE, since the IMSI typically is stored in a Universal Integrated Circuit Card (UICC)/Subscriber Identity Module (SIM) card connected to a Mobile Equipment (ME) to form the UE, and the SIM card can be switched to another ME. As such, uniquely identifying the UE 102 would mean that the IMSI is associated with a certain subscriber of the home PLMN in a database comprised or connected to the home PLMN. It is of cause also known to the skilled person that the IMSI in some systems, such as in at least some current 4G systems, actually is used to identify the UE itself and not only the subscriber.

The words "unique" and "uniquely" shall of course be seen in its context of this invention. From a philosophical point of view, it can perhaps not ever be guaranteed that e.g. a certain number, such as a binary number, being unique in one database or in a cluster of databases related to e.g. a home PLMN, cannot be found somewhere else, such as in a completely different computer network or in a private list, for a completely different subscriber or UE.

Additionally, the secret identifier 110 may be a "long-term" identifier, which, for purposes of the present application, corresponds to a static set of alphanumeric characters (or corresponding digital bit values) that are established based on a premise, understanding, and intent that it is to remain unchanged, absent extenuating circumstances that require an alteration, for entirety of the subscription's effective duration. The secret identifier 110 may be a long-term identifier such as, but not limited to, IMSI and/or one or more of the values that make up the IMSI, such as the mobile subscription identification number (MSIN), mobile network code (MNC), and/or mobile country code (MCC). Alternatively or additionally, the secret identifier 110 may comprise long-term identifier such as an International Mobile Equipment Identity (IMEI), Internet Protocol (IP) address, or the like, or a shorter-term identifier, such as a Globally Unique Temporary Identity (GUTI), Cell Radio Network Temporary Identity (C-RNTI), or any similar known identifier that is kept private or can be made private or otherwise can be kept as a secret between a limited set of devices. With respect to an IP address as a long-term identifier, a static IP address is clearly such an example, but in dependence on use case also an IP address assigned by a Dynamic Host Configuration Protocol server may be a long-term identifier. In other circumstances a dynamically assigned IP address is deemed as a short-term identifier. A long-term identifier as understood by a person skilled in the art does not necessarily have to be a permanent identifier. A permanent/long-term identifier is sometimes in $5^{th}$ generation (5G) discussions called Subscriber Permanent Identifier (SUPI).

Returning to method 200, at block 202, the network node 106 obtains a secret identifier 110 that uniquely identifies the UE. As discussed above, the secret identifier 110 is a secret (i.e., is privately-held by a limited, discrete set of networks and devices) that is shared between the UE and at least a home PLMN of the UE and is sent by the home PLMN to the network node 106.

Furthermore, at block 204 of method 200, the network node 106 performs the operation 108 related to the UE 102, and uses the obtained secret identifier 110 to do so. Although not all operations UE-related operations performed by a network node or a serving PLMN require that the secret identifier 110 be known, some operations (including some required by law) do require (or can optionally utilize) the secret identifier 110 before execution. For instance, the operation 108 may be an operation related to a lawful interception of the UE. A serving PLMN which knows the secret identifier 110 of the UE 102 can therefore support lawful interception without a home PLMN's assistance or visibility. In other examples, the operation 108 may be economic or marketing in nature, such as an operation for recognizing one or more UEs that have previously been served by a particular PLMN and providing one or more incentives for these UEs to connect to the serving PLMN (or, if an optional reselection or handover is imminent, incentive to remain connected to the serving PLMN). In still other examples, the operation may be related to certain UE-specific operational service parameters or guarantees, such as setting or modifying one or more Quality of Service parameters associated with a UE (or user/subscriber). The operation could alternatively be related to policy and/or charging control associated with the UE 102. Although these few examples provide a limited picture of some example operations that may utilize a secret identifier 110 of a UE or network subscriber, the feature of obtaining a secret identifier by a serving PLMN or revealing the secret identifier by a home PLMN can be extended to any operation or process that may be applied at a single-UE granularity.

In addition to the features of blocks 202 and 204, method 200 may include additional or alternative aspects that are not explicitly shown in FIG. 2. For example, the network node 106 of serving PLMN 112 may receive, from the UE, a public identifier (i.e., non-secret or unencrypted identifier associated with the UE) and/or a pseudonym corresponding to the UE. After receiving the public identifier and/or pseudonym, the network node 106 may forward the public identifier and/or pseudonym to the home PLMN 114 of the UE. The public identifier and/or pseudonym sent to the home PLMN may serve as an implicit request for the home PLMN 114 to reveal the secret identifier 110 to the serving PLMN 112 (e.g., to the network node 106), or the network node 106 may generate and send an explicit request for the secret identifier 110 to the home PLMN 114 along with the forwarded public identifier and/or pseudonym. As such, obtaining the secret identifier at block 202 may be in response to the forwarding of the public identifier and/or pseudonym corresponding to the UE 102.

As will be discussed further below, the network nodes of the serving PLMN and/or the home PLMN 114 may perform authentication to help ensure that the secret identifier 110 is not revealed in response to a malicious request by a third-party that is not authorized to obtain the secret identifier 110. As such, in some examples, the network node 106 may receive the secret identifier 110 only after the UE has been successfully authenticated by the home PLMN (and/or the serving PLMN, see below). Therefore, if authentication is unsuccessful at the home PLMN, the home PLMN 114 may inform the serving PLMN that authentication failed (e.g., via a failure message) or may simply not reveal the secret identifier to the serving PLMN, which can serve as an implicit indication of authentication failure in some examples. However, when the secret identifier 110 is sent to the serving PLMN by the home PLMN (for instance, after home PLMN UE authentication or confirmation of serving PLMN authentication success, in some examples) it may be communicated via an Extensible Authentication Protocol (EAP) message from the home PLMN 114 to the serving PLMN 112.

As introduced above, authentication of the UE 102 may also be performed by network nodes 106 of the serving PLMN 112. To perform this authentication, a network node 106 may require a public identifier and/or pseudonym of the UE 102 (for identification of the UE targeted for authentication) and authentication information that contains rules and/or processes necessary to perform the authentication procedure at the network node 106. Therefore, method 200 may include, in some examples, obtaining a public identifier and/or pseudonym of the UE 102 from the UE itself (or from another device that possesses this information) and receiving the authentication information from the home PLMN 114 (e.g., from network node 116). In an aspect, the authentication information is communicated by the home PLMN to the serving PLMN in one or more messages that are formed in an Evolved Packet System-Authentication and Key Agreement (EPS-AKA) format and communicated via an authentication vector that is contained in the one or more communicated messages.

Once the public identifier and/or pseudonym and the authentication information have been obtained/received by the network node 106 or by the serving PLMN 112, generally, the network node 106 performs authentication operations to determine whether the UE is authenticated (i.e., that the UE 102 is truly a subscriber of home PLMN 114 or otherwise permitted to prompt the home PLMN 114 to reveal the secret identifier 110 to the serving PLMN 112). If the authentication operations are successful (e.g., the operations determine that the UE 102 (or a request therefrom) is authentic (i.e., that the UE 102 is a verified subscriber to home PLMN 114)), network node 106 may communicate an authentication success message to the home PLMN to inform the home PLMN that the UE has been successfully authenticated by the serving PLMN. In addition, when received and processed at the home PLMN 114, the authentication success message can trigger the home PLMN to send the secret identifier 110 to the serving PLMN.

In the above-described example, the serving PLMN 112 receives the secret identifier 110 from the home PLMN after the UE 102 has been authenticated by the serving PLMN or by the home PLMN. In these embodiments, the network node 106 may receive the secret identifier from the home PLMN via an authentication-information-answer (AIA) message (e.g., according to the Diameter authentication, authorization, and accounting (AAA) protocol) generated and sent from the home PLMN after authentication of the UE 102 has succeeded. Although performing authentication before the home PLMN sends the secret identifier 110 to the serving PLMN can provide an added level of security for the method 200, it is not a requirement for all embodiments. Accordingly, in some embodiments, the serving PLMN (e.g., via network node 106) may receive the secret identifier 110 from the home PLMN 114 before the UE 102 is authenticated by the serving PLMN 112 or the home PLMN 114. In these alternative embodiments, the secret identifier may be sent via an update-location-answer (ULA) message (e.g., according to the Diameter authentication, authorization, and accounting (AAA) protocol) generated and sent from the home PLMN before authentication of the UE 102 has succeeded at either of the serving or home PLMNs.

In an additional aspect of some embodiments of method 200, as a further security measure to avoid unauthorized dissemination of the secret identifier 110 and to check that the secret identifier sent by the home PLMN is genuine, the serving PLMN 112 (e.g., via network node 106) may verify that a public identifier and the obtained secret identifier 110 correspond to the same UE. Although this verification procedure is mainly described by the present disclosure as being performed by the network node 106 (or by the serving PLMN 112, generally), this is not a limiting feature. Instead, the verification can alternatively or additionally be performed in the home PLMN 114 and/or by another device or network that is not shown in FIG. 1 (e.g., a dedicated security system or AAA service, for example).

When performed at the serving PLMN 112, however, the verification procedure may extend the above-described group of features that can be performed by the network node 106 in executing method 200. For instance, using an asymmetric encryption scheme based on a public key of the home PLMN, which public key is known to both the UE and the home PLMN, may in one embodiment of the verification be as follows. The verification includes the network node 106 obtaining encryption information for encrypting the secret identifier 110, for example, from the home PLMN 114. This encryption information includes the public key of the home PLMN 114 that can be used to encrypt the secret identifier 110 into a public, encrypted identifier of the UE. As mentioned above, this public identifier may be initially obtained by the network node 106 (or the serving PLMN 112, generally) from UE 102, i.e. the UE may previously have generated the public identifier by encrypting its IMSI with the public key of the home PLMN and send this public identifier (i.e. the IMSI encrypted with the public key of the home PLMN) to the network node 106. Once obtained by the network node 106, the encryption information can be utilized by the network node 106 to generate an encrypted secret identifier by encrypting the obtained secret identifier 110 with the public key of the home PLMN. The network node 106 may now proceed by comparing the resulting encrypted secret identifier and the previously received (and stored) public identifier received from the UE. This comparison may result in a determination by the network node 106 that the encrypted secret identifier and the public identifier match. Such a match may indicate that the verification has succeeded. In an aspect, the criteria that define a "match" may be preconfigured by the user or by the home PLMN or serving PLMN. These criteria for determining that a match exists may be tailored to a desired level of precision, from requiring an exact bit-level match or by defining a percentage, ratio, or raw number of matching bits that meets a predefined verification threshold criterion. Regardless of the particular implemented criteria for defining verification success, if the criteria are met, the network node 106 can verify that the public identifier and the secret identifier correspond to the same UE based on determining that the encrypted secret identifier and the public identifier match. As a result, requests from unauthorized UEs having a public identifier that does not "match" the revealed secret identifier 110 can be effectively discovered and remedied to limit the dissemination of the secret identifier 110 to unauthorized parties. In other words, an operation such as lawful interception becomes more reliable by determining that the UE and the home PLMN are not cheating the serving PLMN.

In a first alternative embodiment of the verification, an Elliptic Curve Integrated Encryption Scheme (ECIES) is used. Similarly to the embodiment described above, the home PLMN's public key is known to the UE 102 and the home PLMN 114, but here the UE 102 also has its own pair of public and private keys (i.e. of the UE 102). The UE 102 generates a first symmetric encryption key based on its own private key and the public key of the home PLMN 114. The public identifier is then generated by the UE 102 by encrypting the secret identifier (e.g. IMSI) with the first symmetric encryption key. The public identifier and the public key of the UE 102 is sent to the serving PLMN 112, which receives them and also forwards them to the home PLMN 114. Then, in addition to sending the secret identifier to the serving PLMN, the home PLMN also produces and sends the encryption information in the form of a second symmetric encryption key, which is produced by the home PLMN using the private key of the home PLMN and the received public key of the UE 102. Serving PLMN 112 may now encrypt the secret identifier received from the home PLMN 114 with the second symmetric encryption key, and then perform the verification by comparing the encrypted secret identifier with the public identifier. A match is enabled due to the fact that the second symmetric key is the same as the first symmetric key due to cryptographic properties provided by key exchange algorithms such as Diffie-Hellman.

Figure 3:
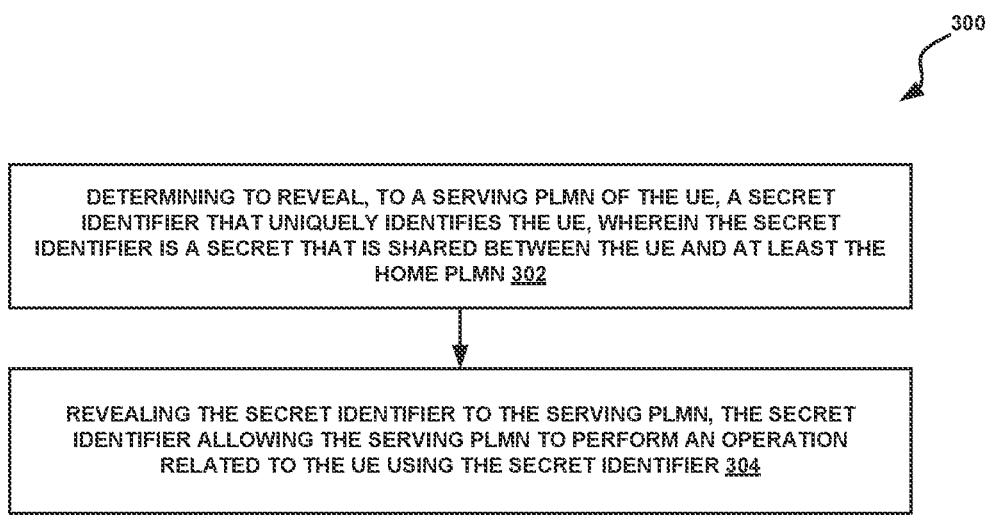
FIG. 3 illustrates a method performed by a network node of a home PLMN according to one or more embodiments.

A second alternative embodiment of the verification is similar to the first alternative embodiment, but instead of encrypting the received secret identifier with the second symmetric encryption key, the serving HPLMN decrypts the public identifier with the second symmetric encryption key and compares the decrypted public identifier with the secret identifier. FIG. 3 illustrates an example method 300 performed by a network node 116 of a home PLMN 114 for revealing, to a disparate serving PLMN 112, a secret identifier 110 of a UE 102 that is served by the serving PLMN 112. According to example method 300, at block 302, the network node 116 determines to reveal, to the serving PLMN 112 of the UE 102, a secret identifier 110 that uniquely identifies the UE 102. As described above, this secret identifier 110 is a secret that is shared between the UE 102 and at least the home PLMN 114. In addition, example method 300 includes the network node 116 revealing the secret identifier to the serving PLMN. In some non-limiting examples, revealing the secret identifier to the serving PLMN can include sending an EAP message to the serving PLMN that includes the secret identifier 110. Regardless of the particular message format utilized to send the secret identifier 110 to the serving PLMN 112, the serving PLMN 112 can perform an operation 108 related to the UE 102 using the revealed secret identifier 110.

Although not explicitly shown in FIG. 3, method 300 can optionally include further aspects, some of which have been introduced above in reference to the method 200 performed on the serving PLMN 112 side. For example, the network node 116 can perform authentication of the UE 102 as an optional additional aspect of method 300. When authentication is done at the home PLMN, it is guaranteed that the UE is present at the serving PLMN. In performing this authentication, the network node 116 can, for example, receiving a public identifier and/or pseudonym of the UE 102, which may be forwarded to the home PLMN 114 by the serving PLMN (for instance, in an explicit or implicit request for the home PLMN 114 to reveal the secret identifier 110 and/or to verify the UE 102) or which may be saved in the home PLMN from a previous authentication, for example. Upon executing the authentication procedure, the network node 116 can determine that the UE 102 has been successfully authenticated based on the public identifier and/or pseudonym. In some implementations, a determination by the network node 116 to reveal the secret identifier to the serving PLMN 112 requires successful authentication of the UE 102. However, in some examples, such prior authentication success is not necessary for revealing the secret identifier 110 to a particular serving PLMN 112, despite the associated increased risk of dissemination of the secret identifier 110 to unauthorized parties.

In certain embodiments wherein the serving PLMN performs the authentication procedure, the home PLMN 114 can communicate authentication information to the serving PLMN 112, which is utilized by the serving PLMN 112 (e.g., at network node 106) to perform independent authentication of the UE 102. The authentication information can be formed in an EPS-AKA format and may be communicated to the serving PLMN 112 via an authentication vector. In addition, in some examples, the network node 116 may receive an authentication success message from the serving PLMN 112 that informs the home PLMN 114 that the UE 102 has been successfully authenticated by the serving PLMN 112. Receiving the authentication success message can trigger the home PLMN 114 to reveal the secret identifier to the serving PLMN 112 in some instances. Revealing the secret identifier 110 may include the network node 116 sending the secret identifier 110 to the serving PLMN via an ULA message. In other example implementations, however, prior UE authentication is not mandated, and as such, the network node 116 can optionally reveal the secret identifier 110 by sending it to the serving PLMN 112 before the UE is authenticated (e.g. by the serving PLMN or the home PLMN 114). In these examples, the network node 116 can send the secret identifier 110 to the serving PLMN 112 after the UE 102 is authenticated by the serving PLMN (e.g., via an AIA message). When authentication is done at the serving PLMN, it is perhaps not guaranteed that the UE is present in the serving PLMN, but the serving PLMN can still be held accountable.

Figure 4:
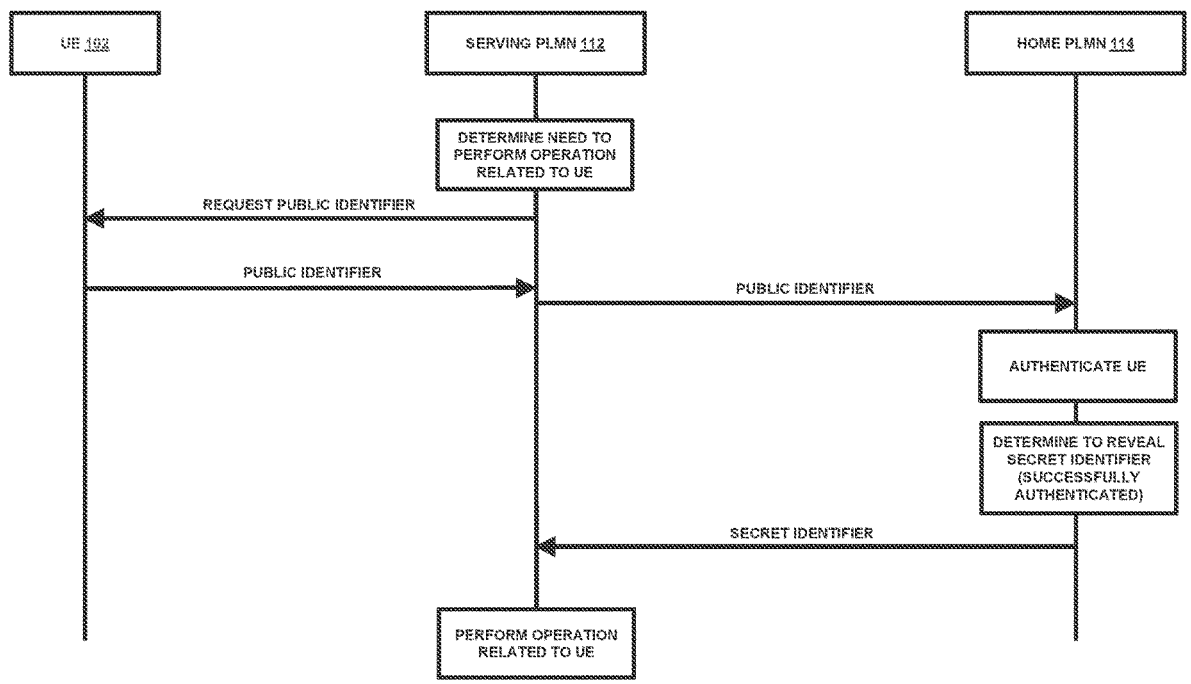
FIG. 4 illustrates a process and signal flow implemented in example embodiments of the invention.
Figure 5:
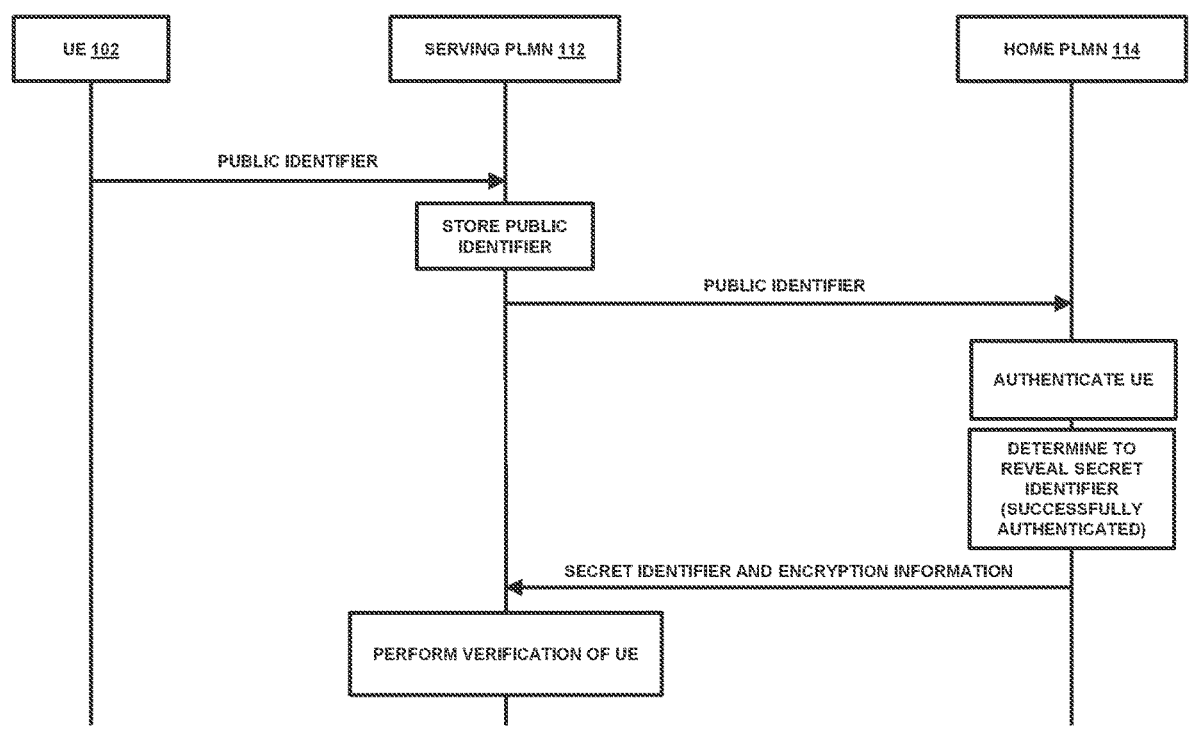
FIG. 5 illustrates a process and signal flow implemented in example embodiments of the present invention.
Figure 6:
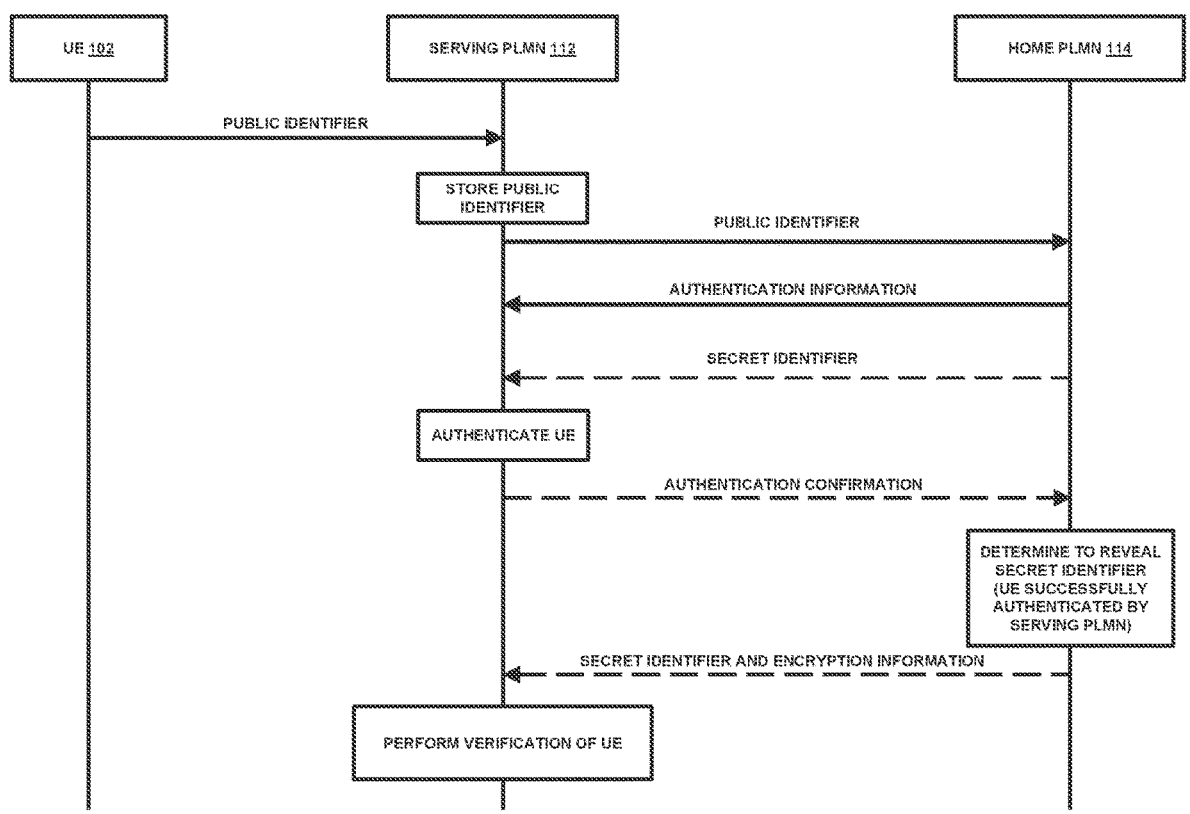
FIG. 6 illustrates a process and signal flow implemented in example embodiments of the present invention.

FIGS. 4, 5, and 6 present different example process and signal flows for different example embodiments for revealing the secret identifier 110 of the UE 102 to a serving PLMN 112 of the UE 102. The example embodiments illustrated in FIGS. 4, 5, and 6 are by no means intended to be an exclusive set of all possible embodiments. Instead, these illustrated example embodiments represent a subset of possible embodiments that are contemplated by the present disclosure.

Turning to these illustrated example embodiments, FIG. 4 illustrates an example implementation whereby authentication of the UE 102 is required before revealing the secret identifier 110 to the serving PLMN 112 and where the authentication is performed at the home PLMN using a public (i.e. non-secret) identifier (such as a pseudonym or an encrypted long-term identifier of the UE 102). As shown in FIG. 4, the serving PLMN may initiate the process by determining a need to perform an operation related to the UE for which the private identifier of the UE is a prerequisite to execution. Based on this determination, the serving PLMN 112 sends a request to the UE 102 for the public identifier of the UE (if not already known by the serving PLMN, in some examples). In response to the request, the UE 102 sends this public identifier to the serving PLMN 112, and after receiving the public identifier, the serving PLMN 112 forwards the public identifier to the home PLMN 114. By forwarding the public identifier to the home PLMN 114, the serving PLMN 112 can implicitly indicate to the home PLMN 114 that the serving PLMN 112 requests that the home PLMN 114 reveal the secret identifier 110 of the UE 102. In alternative examples, the serving PLMN 112 may send a separate, explicit request to the home PLMN 114 for the home PLMN 114 to reveal the secret identifier 110 of the UE 102.

In the example embodiment of FIG. 4, after receiving the public identifier, the home PLMN 114 performs authentication operations, and determines that the authentication is successful. This successful authentication indicates that the UE 102 is actually present in (e.g., is currently being served by) serving PLMN 112. Based on this successful authentication, the home PLMN 114 makes a determination to reveal the secret identifier of the UE 102 to the serving PLMN 112 and proceeds with revealing the secret identifier to the serving PLMN 112. This can be accomplished by sending the secret identifier in a dedicated message or by piggybacking the secret identifier data onto scheduled or queued (and/or future) messages to be sent to the serving PLMN. After receiving the secret identifier, the serving PLMN 112 performs the operation related to the UE.

FIG. 5 illustrates another example implementation whereby the UE verification procedure is performed by the serving PLMN 112. Again in the example embodiment of FIG. 5, authentication of the UE 102 is required before revealing the secret identifier 110 to the serving PLMN 112 and where the authentication is performed at the home PLMN using a public identifier. To ensure readability, the initial steps of determining a need to perform a UE-related operation, requesting the public identifier from the UE, and the serving PLMN performing the operation are not shown in FIG. 5, though these features are optionally included in this example implementation.

As shown, once the requested public identifier (e.g. the IMSI of the UE 102 encrypted with the public key of the home PLMN 114) is returned by the UE 102, the serving PLMN stores the public identifier in memory (e.g., in memory of one or more network nodes) and then forwards the public identifier to the home PLMN 114, which again triggers the home PLMN 114 to perform authentication. As the authentication is successful, the home PLMN 114 determines to reveal the secret identifier to the serving PLMN 112. Furthermore, the home PLMN 114 may send encryption information to the serving PLMN 112 along with the secret identifier, as the encryption information is private (i.e. a secret that may be kept only by the home PLMN 114 and any other devices to which the home PLMN 114 allows encryption information access). The encryption information may include a public key associated with the home PLMN 114. In alternative implementations, the encryption information may be sent before (or after) the home PLMN 114 sends the secret identifier, and in other examples where the encryption information was previously obtained by the serving PLMN 112 during a separate process iteration, may not be sent at all for subsequent process iterations.

Upon receiving the secret identifier and the encryption information from the home PLMN 114, the serving PLMN 112 performs a verification operation, which can help ensure that the public identifier does not correspond to a different UE than the UE 102 to which the revealed secret identifier corresponds. As explained in reference to earlier figures, this verification can involve several steps, which may include utilizing the encryption information to generate an encrypted version of the secret identifier. Once the encrypted secret identifier is generated, the serving PLMN may compare it to the stored public identifier. If the comparison reveals that the public identifier and the encrypted secret identifier match (e.g. meet certain static or alterable criteria defining a match), the verification procedure may be successful in determining that the public identifier and the secret identifier correspond to a single UE that is an authenticated subscriber of the home PLMN 114. Again, though not explicitly shown in FIG. 5, the serving PLMN may perform the operation related to the UE after verification.

FIG. 6 illustrates another example implementation whereby the UE authentication procedure is performed by the serving PLMN 112. Also, the serving PLMN 112 of FIG. 6 performs the UE verification procedure that is outlined above with respect to FIG. 5. Unlike the embodiments of proceeding in FIGS. 4 and 5, in the example embodiment of FIG. 6, authentication of the UE 102 is optional before revealing the secret identifier 110 to the serving PLMN 112. As such, the home PLMN 114 may reveal the secret identifier to the serving PLMN 112 before any authentication of the UE is performed (here, before authentication is performed at the serving PLMN 112). Alternatively, the home PLMN 114 may be configured to require confirmation from the serving PLMN 112 that the UE has been successfully authenticated before making a determination to send the secret identifier to the serving PLMN 112. Both of these options are illustrated in the process and signal flow of FIG. 6, and the signals associated with these options are indicated as optional (because the "other" option may be implemented in every case) by dashed signal lines.

To again ensure readability, the initial steps of determining a need to perform a UE-related operation, requesting the public identifier from the UE, and the serving PLMN performing the operation are not shown in FIG. 6, though these features are optionally included in this example implementation.

As illustrated at the top of the process and signal flow of FIG. 6, once the requested public identifier is sent to the serving PLMN 112 by the UE 102, the serving PLMN 112 stores the public identifier in memory (e.g., in memory of one or more network nodes) and then forwards the public identifier to the home PLMN 114. Rather than triggering authentication by the home PLMN 114 as in FIGS. 4 and 5, however, receiving the public identifier triggers the home PLMN 114 to send authentication information necessary for UE authentication to the serving PLMN 112. Furthermore, as mentioned above, the home PLMN 114 may optionally send the secret identifier before the authentication is performed by the serving PLMN 112 (in one option where authentication or confirmation thereof is not required by the home PLMN 114 before revealing the secret identifier). This is represented by the topmost dashed signal line of FIG. 6.

Upon receiving the authentication information, the serving PLMN 112 may perform the UE authentication procedure. If the authentication fails, the process can be terminated and an indication of such failure may optionally be sent to the home PLMN 114 (not shown). However, if the authentication is successful and the home PLMN 114 requires confirmation of successful UE authentication before revealing the secret identifier, the serving PLMN generates and sends an authentication confirmation message to the home PLMN 114. In response to receiving the authentication confirmation message, the home PLMN 114 determines to reveal the secret identifier to the serving PLMN 112.

Furthermore, as was previously shown in reference to FIG. 5, the home PLMN 114 may send encryption information to the serving PLMN 112 along with the secret identifier, which causes the serving PLMN 112 to perform the steps of the verification operation to determine that the public identifier and the secret identifier correspond to a single UE that is an authenticated subscriber of the home PLMN 114. Again, though not explicitly shown in FIG. 5, the serving PLMN may perform the operation related to the UE after verification.

Figure 7:
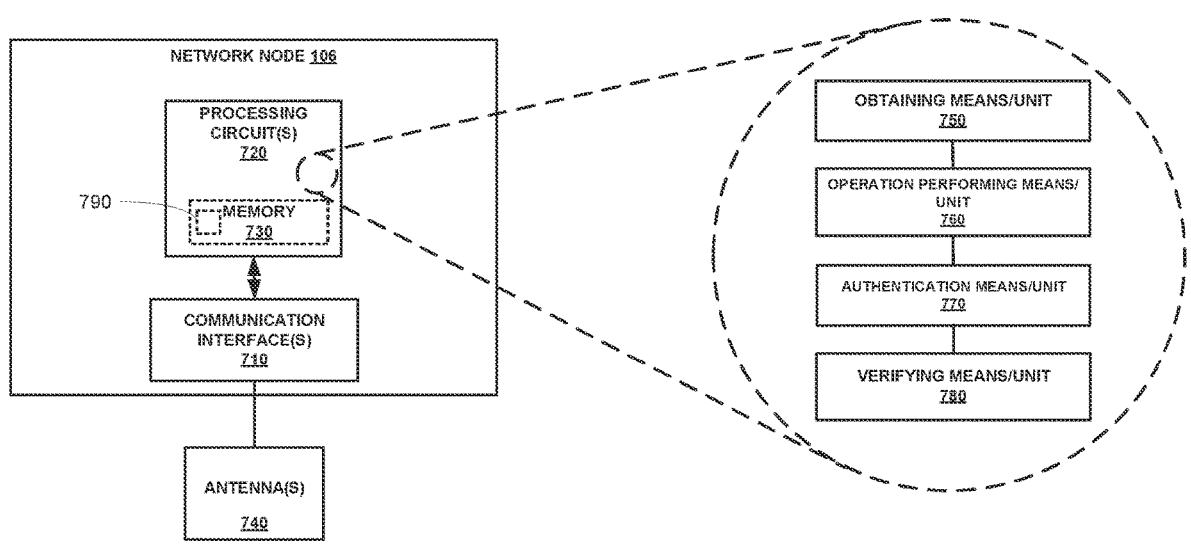
FIG. 7 illustrates aspects of an example network node of a serving PLMN in example embodiments of the invention.

FIG. 7 illustrates additional details of an example network node 106 of a serving PLMN 112 according to one or more embodiments. The network node 106 is configured, e.g., via functional means or units (also may be referred to as modules or components herein), to implement processing to perform certain aspects described above in reference to FIGS. 2 and 4-6. The network node 106 in some embodiments for example includes an obtaining means or unit 750 for obtaining a secret identifier of a UE, an operation performing means or unit 760 for performing one or more operations requiring the secret identifier of a particular UE, an authentication means or unit 770 for performing UE authentication processing, and/or a verifying means or unit 780 for performing verification procedures associated with a particular UE. These and potentially other functional means or units (not shown) together perform the aspects of method 200 presented in FIG. 2 and/or features described in FIGS. 4-6 as being related to the serving PLMN 112 and/or network node 106.

In at least some embodiments, the network node 106 comprises one or more processing circuits 720 configured to implement processing of the method 200 of FIG. 2 and certain associated processing of the features described in relation to FIGS. 4-6, such as by implementing functional means or units above. In one embodiment, for example, the processing circuit(s) 720 implements functional means or units as respective circuits. The functional units may thus be implemented with pure hardware, like ASICs or FPGAs. In another embodiment, the circuits in this regard may comprise circuits dedicated to performing certain functional processing and/or one or more microprocessors in conjunction with a computer program product in the form of a memory 730. In embodiments that employ memory 730, which may comprise one or several types of memory such as read-only memory (ROM), random-access memory, cache memory, flash memory devices, optical storage devices, etc., the memory 730 stores program code that, when executed by the one or more microprocessors carries out the techniques described herein.

In one or more embodiments, the network node 106 also comprises one or more communication interfaces 710. The one or more communication interfaces 710 include various components (e.g., antennas 740) for sending and receiving data and control signals. More particularly, the interface(s) 710 include a transmitter that is configured to use known signal processing techniques, typically according to one or more standards, and is configured to condition a signal for transmission (e.g., over the air via one or more antennas 740). Similarly, the interface(s) include a receiver that is configured to convert signals received (e.g., via the antenna(s) 740) into digital samples for processing by the one or more processing circuits. In an aspect, the obtaining module or unit 750 may comprise or may be in communication with the receiver. The transmitter and/or receiver may also include one or more antennas 740.

Those skilled in the art will also appreciate that embodiments herein further include corresponding computer programs. A computer program 790 comprises instructions which, when executed on at least one processor of the network node 106, cause the network node 106 to carry out any of the respective processing described above. Furthermore, the processing or functionality of network node 106 may be considered as being performed by a single instance or device or may be divided across a plurality of instances of network node 106 that may be present in a given serving PLMN such that together the device instances perform all disclosed functionality. In addition, network node 106 may be any known type of device associated with a PLMN that is known to perform a given disclosed process or function. Examples of such network nodes 106 include eNBs, Mobility Management Entities (MMEs), gateways, servers, and the like. In other words, the network node 106 may be a node residing in a core network part or an access network part of the serving PLMN.

Figure 8:
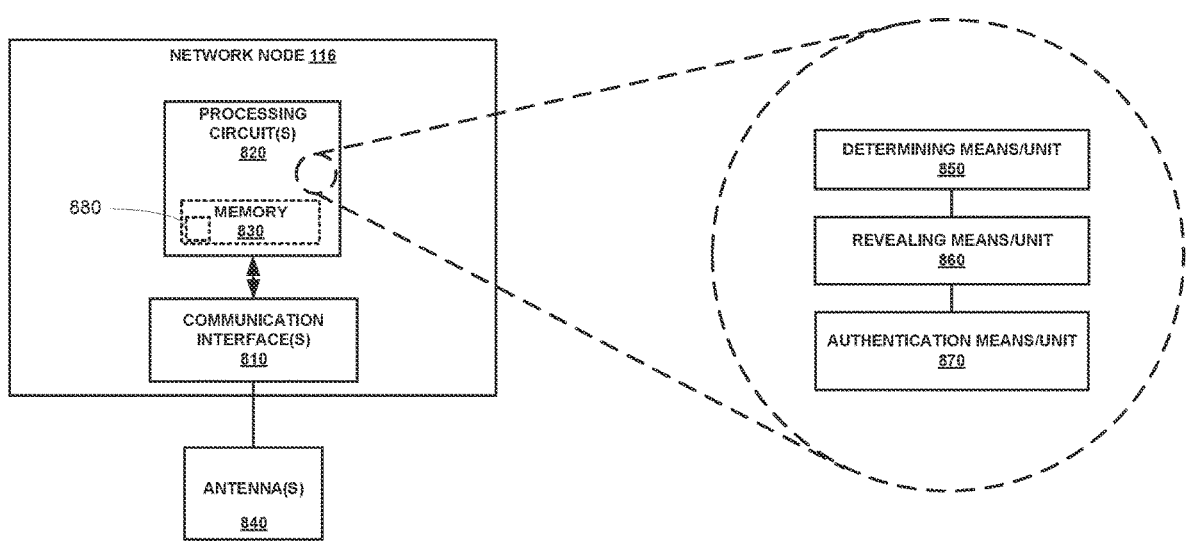
FIG. 8 illustrates aspects of an example network node of a home PLMN in example embodiments of the invention.

FIG. 8 illustrates additional details of an example network node 116 of a home PLMN 114 according to one or more embodiments. The network node 116 is configured, e.g., via functional means or units (also may be referred to as modules or components herein), to implement processing to perform certain aspects described above in reference to FIGS. 2 and 4-6. The network node 116 in some embodiments for example includes a determining means or unit 850 for determining whether to reveal a secret identifier of a UE, a revealing means or unit 860 for revealing the secret identifier, and an authentication means or unit 870 for performing authentication of UEs. These and potentially other functional means or units (not shown) together perform the aspects of method 300 presented in FIG. 3 and/or features described in FIGS. 4-6 as being related to the home PLMN 114 and/or network node 116.

In at least some embodiments, the network node 116 comprises one or more processing circuits 820 configured to implement processing of the method 200 of FIG. 3 and certain associated processing of the features described in relation to home PLMN 114 and/or network node 116 to FIGS. 4-6, such as by implementing functional means or units above. In one embodiment, for example, the processing circuit(s) 820 implements functional means or units as respective circuits. The functional units may thus be implemented with pure hardware, like ASICs or FPGAs. In another embodiment, the circuits in this regard may comprise circuits dedicated to performing certain functional processing and/or one or more microprocessors in conjunction with a computer program product in the form of a memory 830. In embodiments that employ memory 830, which may comprise one or several types of memory such as read-only memory (ROM), random-access memory, cache memory, flash memory devices, optical storage devices, etc., the memory 830 stores program code that, when executed by the one or more microprocessors, carries out the techniques described herein.

In one or more embodiments, the network node 116 also comprises one or more communication interfaces 810. The one or more communication interfaces 810 include various components (e.g., antennas 840) for sending and receiving data and control signals. More particularly, the interface(s) 810 include a transmitter that is configured to use known signal processing techniques, typically according to one or more standards, and is configured to condition a signal for transmission (e.g., over the air via one or more antennas 840). In an aspect, the revealing module or unit 860 may comprise or may be in communication with the transmitter. Similarly, the interface(s) include a receiver that is configured to convert signals received (e.g., via the antenna(s) 840) into digital samples for processing by the one or more processing circuits. The transmitter and/or receiver may also include one or more antennas 840.

Those skilled in the art will also appreciate that embodiments herein further include corresponding computer programs. A computer program 880 comprises instructions which, when executed on at least one processor of the network node 116, cause the network node 116 to carry out any of the respective processing described above. Furthermore, the processing or functionality of network node 116 may be considered as being performed by a single instance or device or may be divided across a plurality of instances of network node 116 that may be present in a given home PLMN such that together the device instances perform all disclosed functionality. In addition, network node 116 may be any known type of device associated with a PLMN providing wireless communication services and/or network access to one or more UEs that is known to perform a given disclosed process or function. Examples of such network nodes 116 include eNBs, Mobility Management Entities (MMEs), gateways, servers, and the like. In other words, the network node 116 may be a node residing in a core network part or an access network part of the home PLMN.

Embodiments further include a carrier containing such a computer program. This carrier may comprise one of an electronic signal, optical signal, radio signal, or computer readable storage medium (like the memories 730 and 830 respectively). A computer program in this regard may comprise one or more code modules or code parts corresponding to the means or units described above.

Figure 9:
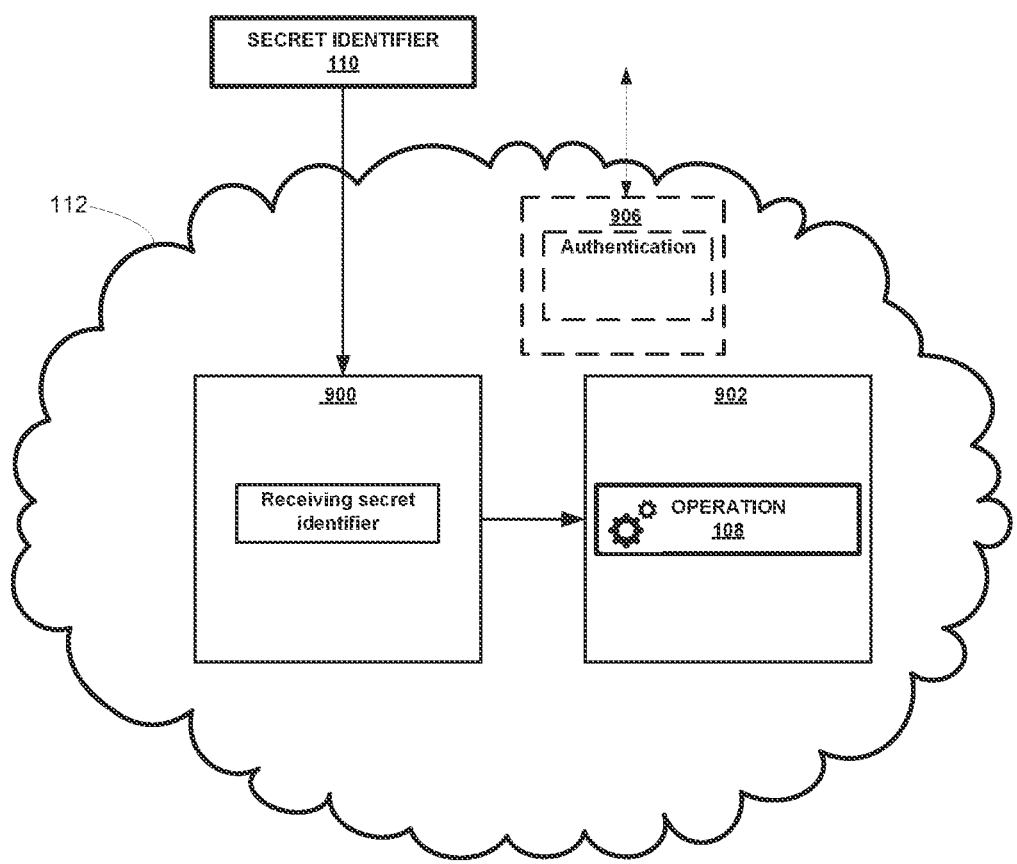
FIG. 9 illustrates an embodiment of a serving PLMN.

As mentioned above in conjunction with FIG. 1, various nodes of the serving PLMN 112 may perform the steps attributed to the serving PLMN or the network node 106. FIG. 9 illustrates an embodiment of a serving PLMN within that concept. The serving PLMN here comprises at least two network nodes. A first network node 900 is similarly to the network node 106 configured to receive the secret identifier 110 from the home PLMN after the UE 102 has been successfully authenticated. The first network node may then initiate a second network node 902 to perform the operation 108 using the secret identifier. In case the serving PLMN performs the authentication, a third network node 906 of the serving PLMN may be configured to authenticate the UE 102 and communicate with the home PLMN, i.e. informing the home PLMN of a successful authentication or explicitly requesting the home PLMN to send the secret identifier 110 to the serving PLMN/the first network node 900.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method performed by a network node of a serving public land mobile network (PLMN) associated with a user equipment (UE), the method comprising:
   receiving a public identifier corresponding to the UE, wherein the UE has a home PLMN and the serving PLMN is not the UE's home PLMN;
   forwarding to the UE's home PLMN the public identifier corresponding to the UE;
   receiving from the UE's home PLMN an international mobile subscriber identity (IMSI) in response to forwarding the public identifier to the UE's home PLMN, wherein the IMSI uniquely identifies the UE and is a secret that is shared between the UE and at least the UE's home PLMN;
   receiving authentication information from the home PLMN, the authentication information allowing the serving PLMN to perform authentication of the UE;
   using the authentication information to determine, by the serving PLMN, that the UE is successfully authenticated; and
   performing an operation related to charging control using the IMSI.

2. The method of claim 1, wherein the IMSI is received based on the UE being successfully authenticated by the home PLMN.

3. The method of claim 1, further comprising communicating an authentication success message to the home PLMN to inform the home PLMN that the UE has been successfully authenticated by the serving PLMN, the authentication success message triggering the home PLMN to send the secret identifier to the serving PLMN.

4. The method of claim 1, wherein obtaining the IMSI comprises receiving the IMSI from the home PLMN before the UE is authenticated by the serving PLMN.

5. The method of claim 4, wherein receiving the IMSI from the home PLMN comprises receiving an authentication-information-answer message from the home PLMN.

6. The method of claim 1, wherein the public identifier comprises an encrypted version of the IMSI.

7. A network node of a serving public land mobile network (PLMN) associated with a user equipment (UE), the network node comprising:
   a processor; and
   a memory, the memory containing instructions executable by the processor wherein the network node is configured to:
   receive a public identifier corresponding to the UE, wherein the UE has a home PLMN and the serving PLMN is not the UE's home PLMN;
   forward the public identifier to a home PLMN of the UE;
   receive from the home PLMN an international mobile subscriber identity (IMSI) in response to the forwarding of the public identifier, wherein the IMSI uniquely identifies the UE and is a secret that is shared between the UE and at least the home PLMN;
   receive authentication information from the home PLMN, the authentication information allowing the serving PLMN to perform authentication of the UE;
   use the authentication information to determine, by the serving PLMN, that the UE is successfully authenticated; and
   perform an operation related to charging control of the UE using the IMSI.

8. The network node of claim 7, wherein the public identifier comprises an encrypted version of the IMSI.

9. A method performed by a serving public land mobile network (PLMN) associated with a user equipment (UE), the method comprising:
   receiving a public identifier corresponding to the UE, wherein the UE has a home PLMN and the serving PLMN is not the UE's home PLMN;
   forwarding to the UE's home PLMN the received public identifier;
   receiving, from the UE's home PLMN after the UE has been successfully authenticated by the home PLMN or the serving PLMN, an international mobile subscriber identity (IMSI) that uniquely identifies the UE and is a secret previously shared between the UE and the home PLMN;
   receiving authentication information from the home PLMN, the authentication information allowing the serving PLMN to perform authentication of the UE;
   using the authentication information to determine, by the serving PLMN, that the UE is successfully authenticated; and
   performing a charging control related to the UE.

10. The method of claim 9, wherein the UE is authenticated by the serving PLMN.

11. The method of claim 9, wherein the public identifier comprises an encrypted version of the IMSI.

* * * * *